United States Patent [19]

Thomas

[11] Patent Number: 4,719,118
[45] Date of Patent: Jan. 12, 1988

[54] LOW CALORIE DAIRY SNACK PRODUCT

[76] Inventor: Walter A. Thomas, Rte. 1, Box 123, Barneveld, Wis. 53507

[21] Appl. No.: 812,079

[22] Filed: Dec. 23, 1985

[51] Int. Cl.⁴ .......................... A23C 9/00; A23C 19/00
[52] U.S. Cl. ...................... 426/580; 426/582; 426/438; 426/445; 426/804
[58] Field of Search ................. 426/446–449, 426/580, 582, 445, 456, 804, 808, 438

[56] References Cited

U.S. PATENT DOCUMENTS

| | | | |
|---|---|---|---|
| 939,495 | 11/1909 | Govers | 426/465 |
| 1,070,781 | 8/1913 | Davis | 426/397 |
| 1,689,357 | 10/1928 | Merrell | 426/588 |
| 2,701,200 | 2/1955 | Huber | 426/446 |
| 2,839,407 | 6/1958 | Brochner | 426/586 |
| 3,190,760 | 6/1965 | Morgan | 426/580 |
| 3,600,193 | 8/1971 | Glabe et al. | 426/808 |
| 3,650,769 | 3/1972 | Fritzberg | 426/808 |
| 3,652,294 | 3/1972 | Marotta et al. | 426/446 |

FOREIGN PATENT DOCUMENTS

| | | |
|---|---|---|
| 346754 | 7/1960 | Switzerland . |
| 350670 | 6/1931 | United Kingdom . |

Primary Examiner—Raymond N. Jones
Assistant Examiner—Marianne M. Cintins
Attorney, Agent, or Firm—Isaksen, Lathrop, Esch, Hart & Clark

[57] ABSTRACT

An expanded low calorie dairy snack food product and method of manufacture is disclosed. The product which consists of water and a dairy product will expand or puff with excellent structural integrity without the use of farinaceous or carbohydrate ingredients or other binder.

5 Claims, No Drawings

LOW CALORIE DAIRY SNACK PRODUCT

BACKGROUND OF INVENTION

Expanded farinaceous snack food products contain substantial amounts of carbohydrates and fat and are, because of high energy content, unacceptable to the calorie conscious consumer. An expanded snack fabricated from lowfat dairy cheese or curd would be a nutritious, healthful substitute.

SUMMARY OF INVENTION

The invention relates to the formation of a protein snack food product low in calorie content. The manufacture of the unique food product involves the preparation of anaqueous, homogeneous mixture containing a lowfat dairy product to which can be added other proteinaceous material and other food ingredients and the formation of the product in accordance with techniques well known in the art of expanded food fabrication. The principal components of the invention are adaptable to a variety of formulations, to many processing variations, and to an array of processing equipment.

DESCRIPTION OF PREFERRED EMBODIMENTS

The invention pertains broadly to processes which utilize low-fat dairy cheese and milk curd for producing an expanded food product.

The product is made from a mixture of water and crumbed low-fat dairy cheese or skim milk curd. The mixture is mechanically blended at high speed for several minutes under ambient comditions until a homogeneous mass of semi-fluid consistency is obtained. The mass is sheeted to a thickness of about ⅛ inch, dried to a moisture content of about 8 percent and fragmented roughly to piece size desired. Or the mass is partially dried to a condition where it can be cut or stamped or processed with a forming extruder into bits of the desired shape and size and then dried to a moisture content of about 8 percent. The dried product is puffed in accordance with techniques well known in the art. With suitable forming equipment, puffed crusts (e.g., pizza and taco-type crusts) and center (e.g., balls dipped in carob) can be fabricated. Puffed flakes and crumbles suitable for incorporation in ready-to-eat foods, e.g., flaked breakfast cereal, can also be fabricated.

The protein content of the product is easily increased by preparing an aqueous slurry of a vegetable or animal protein source, e.g., soy protein isolate or casein. The slurry is mechanically blended at high speed for several minutes at room temperature, the crumbled lowfat cheese or skim milk curd is added, and the admixture is blended at high speed until a homogeneous mass of semi-fluid consistency is obtained.

In all formulations, discrete particles of dehydrated, freeze-dried, or raw vegetables and/or fruits or other foreign food adjuncts can be blended with the product. Vitamins, minerals, flavoring, colorant, and other food ingredients can be added to the product by methods known in the art. Ingredients can be added to the mass while in a viscous state; and ingredients can be dusted or sprayed on pieces of the mass before drying, when partially dried, when dried to the moisture content suitable for puffing (about 8 percent), or after the pieces are puffed. The dried product can also be dipped in an aqueous mixture of dehydrated cheese solids or other fluid dressing before or after puffing. Or the dried product can be puffed immersed in an aqueous dressing. Dehydrated cheese is commonly used to impart to snack food a savory cheese flavor.

Following are examples of formulations and description of forming procedures:

EXAMPLE 1

Water: 35.85 G.

Cottage cheese (directly set), ½% fat, 78% moisture: 57.67

EXAMPLE 2 Water: 35.85

Soy protein isolate, 92% protein: 3.95

Cottage cheese (directly set), ½% fat, 78% moisture: 57.67

Protein isolate is mixed under ambient conditions with water in mechanical blender at high speed for about two minutes or until hydration of the protein isolate occurs (mixing time depends on energy of blender). Cottage cheese at room temperature is added to slurry and blended at high speed until a homogeneous mass is obtained (about 4 minutes).

EXAMPLE 3

Water: 26.50 G.

Skim milk curd, 74% moisture: 88.50

EXAMPLE 4

Water: 35.85

Mozzarella cheese, ½% fat, 60–63% moisture: 57.67

In all examples, as in example 2, ingredients are blended under ambient conditions at high speed for about 4 minutes, or until a semi-fluid consistency is obtained.

In examples 1, 3, and 4, protein concentrate can be added as in in example 2. In all examples a liquid other than water, e.g., whey, may be used.

As indicated hereinbefore, animal protein can be utilized. In example 2, 7.25 grams Irish Casein, 95% protein, dry, extra edible grade, can be substituted for the 3.95 grams of soy protein isolate. Calcium caseinate and yeast-whey protein are other examples of animal proteins which can be used. Combinations of protein sources may be employed.

Small amounts of farinaceous material, e.g., gelatinized cornmeal, can be added if desired. The dairy product and liquid are slightly heated before blending with farinaceous material.

A hydrophilic colloid such as methylcellulose may be utilized to provide additional lubrication and cohesion to the mass during extrusion or other forming process, with or without the addition of proteinaceous material to the dairy product.

Moisture content of the mass in all examples is about 84 percent. Percentage of moisture can be altered considerably to suit need of fabricator. Moisture can be added during extrusion forming or other forming process.

The product may be formed by the following procedures:

1. The mass is sheeted to a thickness of about ⅛ inch and dried in a ventilated oven at a temperature below 125° F. to a moisture content of about 8 percent. The dried sheet, which has a brittle consistency, is then broken into small pieces.

2. Or the mass is partially dried to a condition where it can be cut or stamped or be processed with a forming extruder into bits of the desired configuration and size and then dried to a moisture content of about 8 percent.

3. The bits are expanded in an air dehydration chamber at a temperature of about 225° F., in a radiant-heat vacuum drier below 125° F., or in oil at a temperature of about 350° F. The bits can be dried and expanded simultaneously, e.g., in a vacuum drier.

A crisp, cohesive product is formed without the use of farinaceous material or other binder material.

Examples 1 and 3, expanded in air, contain about 15 to 18 percent protein. The low fat, high protein content of air expanded examples containing protein concentrate is indicated by analysis of Example 2: fat, 1.87 percent; protein, 83.6 percent. Expansion in oil will increase calorie content, although oil absorption is minimal.

The examples of formulations cited and the fabrication procedures described are illustrative and are not intended to limit the invention to certain formulations and fabrication processes. Further, plant production procedures could differ drastically from benchtop production procedures. The spirit and scope of the invention are limited only by the terms of the following claims.

I claim:

1. A process for preparing a puffed, lowfat dairy food product wherein the steps consist of:
   (a) forming a mixture consisting of water and a dairy product selected from the group consisting of cottage cheese and skim milk curd;
   (b) blending said mixture of step (a) to form a homogeneous, semi-fluid mass;
   (c) sheeting said mass of step (b) to a thickness of about ⅛ inch;
   (d) drying said sheeted mass in a ventilated oven at a temperature no greater than 125° F. to achieve a moisture content of approximately 8 percent; and
   (e) expanding said dried sheet mass of step (d) in an air dehydration chamber at a temperature of approximately 225° F.

2. The process according to claim 1 wherein said dairy cheese comprises crumbled lowfat dairy cheese.

3. The process according to claim 1 wherein said mixture of step (a) is mechanically blended at high speed for several minutes under ambient conditions in order to form said homogeneous semi-fluid mass.

4. The process according to claim 1 wherein said water is in the form of whey.

5. A process for preparing a puffed, lowfat dairy food product wherein the steps consist of:
   (a) forming a mixture consisting of water and a dairy product selected from the group consisting of cottage cheese and skim milk curd;
   (b) blending said mixture of step (a) to form a homogeneous, semi-fluid mass;
   (c) sheeting said mass of step (b) to a thickness of about ⅛ inch;
   (d) drying said sheeted mass in a ventilated oven at a temperature no greater than 125° F. to achieve a moisture content of approximately 8 percent; and
   (e) expanding said dried sheet mass of step (d) by placement in oil at a temperature of about 350° F.

* * * * *